United States Patent
Bijor et al.

(10) Patent No.: US 11,087,287 B2
(45) Date of Patent: Aug. 10, 2021

(54) SYSTEM AND METHOD FOR GENERATING EVENT INVITATIONS TO SPECIFIED RECIPIENTS

(71) Applicant: Uber Technologies, Inc., San Francisco, CA (US)

(72) Inventors: Rahul Bijor, San Francisco, CA (US); Andrew Quinn, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 254 days.

(21) Appl. No.: 15/582,040

(22) Filed: Apr. 28, 2017

(65) Prior Publication Data

US 2018/0315021 A1 Nov. 1, 2018

(51) Int. Cl.
| | |
|---|---|
| G06Q 10/10 | (2012.01) |
| G08G 1/00 | (2006.01) |
| G06Q 10/06 | (2012.01) |
| H04W 4/21 | (2018.01) |
| H04W 4/021 | (2018.01) |

(52) U.S. Cl.
CPC . *G06Q 10/1093* (2013.01); *G06Q 10/063114* (2013.01); *G08G 1/20* (2013.01); *H04W 4/021* (2013.01); *H04W 4/21* (2018.02)

(58) Field of Classification Search
CPC ...... G06Q 50/01; G06Q 10/109; G06Q 10/02; G06Q 50/30; G06Q 10/06311; G06Q 10/047; G06Q 10/08355
See application file for complete search history.

(56) References Cited

U.S. PATENT DOCUMENTS

| | | | |
|---|---|---|---|
| 7,024,205 | B1 | 4/2006 | Hose |
| 7,519,916 | B1 | 4/2009 | Hartwell |
| 8,762,209 | B2 | 6/2014 | Walker |
| 9,172,738 | B1 | 10/2015 | daCosta |
| 9,197,696 | B1 | 11/2015 | Jakatdar |
| 9,922,469 | B1 | 3/2018 | Ashton |
| 9,997,863 | B2 | 5/2018 | Dryjanski |

(Continued)

FOREIGN PATENT DOCUMENTS

| | | |
|---|---|---|
| CA | 2975002 | 8/2016 |
| WO | WO 2010142862 | 12/2010 |
| WO | WO2011/132181 | 10/2011 |

OTHER PUBLICATIONS

Trasee, "UberEVENTS: A Ride For Every Occasion," Uber Newsroom, Nov. 16, 2015, <https://www.uber.com/newsroom/uberevents-a-ride-for-every-occasion/>.*

(Continued)

*Primary Examiner* — Renae Feacher
(74) *Attorney, Agent, or Firm* — Mahamedi IP Law LLP

(57) ABSTRACT

A network system is capable of facilitating network services to be performed in connection with the events created by users. Based on a created event, event invitations can be transmitted to recipients specified in the created event. Upon receiving acceptances in response to the event invitations, the network system can be configured to identify service providers to render services to the recipients in connection with the event. One or more geo-fenced and time-bound gifts or discounts can be specified to be applied to the services rendered in connection with the event.

20 Claims, 6 Drawing Sheets

(56) References Cited

U.S. PATENT DOCUMENTS

| | | |
|---|---|---|
| 9,990,655 B2 | 6/2018 | MacTiernan |
| 10,275,784 B2 | 4/2019 | Thomas |
| 10,354,286 B1 | 7/2019 | Walker |
| 2002/0034292 A1 | 3/2002 | Tuoriniemi |
| 2004/0198366 A1 | 10/2004 | Crocker |
| 2004/0202132 A1 | 10/2004 | Heinonen |
| 2005/0177799 A1 | 8/2005 | Knight |
| 2006/0059023 A1 | 3/2006 | Mashinsky |
| 2007/0011233 A1* | 1/2007 | Manion .............. G06Q 10/10 709/204 |
| 2009/0113296 A1 | 4/2009 | Lacy |
| 2010/0179750 A1 | 7/2010 | Gum |
| 2011/0099040 A1 | 4/2011 | Felt |
| 2011/0153629 A1* | 6/2011 | Lehmann ........... G06Q 30/06 707/758 |
| 2011/0166862 A1 | 7/2011 | Eshed |
| 2011/0238289 A1 | 9/2011 | Lehmann |
| 2012/0215640 A1 | 8/2012 | Ramer |
| 2012/0311584 A1 | 12/2012 | Gruber |
| 2013/0036117 A1 | 2/2013 | Fisher |
| 2013/0090950 A1 | 4/2013 | Rao |
| 2013/0132140 A1 | 5/2013 | Amin |
| 2013/0138723 A1 | 5/2013 | Ku |
| 2013/0246301 A1 | 9/2013 | Radhakrishnan |
| 2013/0268406 A1 | 10/2013 | Radhakrishnan |
| 2013/0311997 A1 | 11/2013 | Gruber |
| 2014/0082069 A1* | 3/2014 | Varoglu .............. G06Q 50/01 709/204 |
| 2014/0164525 A1* | 6/2014 | Malik ................. H04W 4/14 709/206 |
| 2014/0195972 A1 | 7/2014 | Lee |
| 2014/0221006 A1* | 8/2014 | Jhanji ............. G06Q 30/0259 455/456.1 |
| 2014/0364150 A1 | 12/2014 | Marti |
| 2015/0012341 A1* | 1/2015 | Amin ................ G01C 21/3438 705/13 |
| 2015/0039368 A1* | 2/2015 | Polyakov ............ G06Q 50/01 705/7.19 |
| 2015/0099461 A1 | 4/2015 | Holden |
| 2015/0161564 A1 | 6/2015 | Sweeney |
| 2015/0248689 A1 | 9/2015 | Paul |
| 2016/0006702 A1* | 1/2016 | Chestnut ............. H04L 51/16 713/168 |
| 2016/0026936 A1* | 1/2016 | Richardson .......... G06Q 10/02 705/5 |
| 2016/0027306 A1* | 1/2016 | Lambert ............. G08G 1/202 701/117 |
| 2016/0048804 A1 | 2/2016 | Paul |
| 2016/0069694 A1 | 3/2016 | Tao |
| 2016/0105787 A1 | 4/2016 | Hammer |
| 2016/0140789 A1 | 5/2016 | Wickersham, III |
| 2016/0165510 A1 | 6/2016 | Jun |
| 2016/0171584 A1* | 6/2016 | Cao ................. G06Q 30/0641 705/26.62 |
| 2016/0203522 A1 | 7/2016 | Shiffert |
| 2016/0300318 A1* | 10/2016 | Godil ............. G06Q 30/0283 |
| 2017/0013408 A1 | 1/2017 | Grzywaczewski |
| 2017/0052034 A1* | 2/2017 | Magazinik ......... G01C 21/3438 |
| 2017/0126837 A1 | 5/2017 | Wang |
| 2017/0132540 A1* | 5/2017 | Haparnas ......... G06Q 10/06311 |
| 2017/0147951 A1 | 5/2017 | Meyer |
| 2017/0169366 A1 | 6/2017 | Klein |
| 2017/0186126 A1* | 6/2017 | Marco ............... G01C 21/3438 |
| 2017/0191842 A1* | 7/2017 | Magazinik ......... G01C 21/3438 |
| 2017/0193458 A1 | 7/2017 | Marco |
| 2017/0220966 A1 | 8/2017 | Wang |
| 2017/0357408 A1 | 12/2017 | Anglin |
| 2018/0089784 A1 | 3/2018 | Yamashita |
| 2018/0091604 A1 | 3/2018 | Yamashita |
| 2018/0092057 A1 | 3/2018 | Yamashita |
| 2018/0131767 A1* | 5/2018 | Kozman ........... G01C 21/3407 |
| 2018/0158166 A1* | 6/2018 | Tulabandhula ....... G06Q 50/30 |
| 2018/0315021 A1 | 11/2018 | Bijor |
| 2018/0315088 A1 | 11/2018 | Bijor |
| 2019/0050775 A1 | 2/2019 | Bijor |
| 2019/0306258 A1 | 10/2019 | Yamashita |
| 2020/0022101 A1 | 1/2020 | Yamashita |

OTHER PUBLICATIONS

Borison, Rebecca, "Uber Brings its SUV Fleet to NYC", Jul. 30, 2014, Business Insider, p. 1.

Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.

ISR and Written Opinion in PCT/US2017/053469 dated Dec. 8, 2017.

Cody Toombs: Maps v.9.19 Introduces New 'Driving Mode' with Traffic Update and ETAs, Audio Toggle for Navigation, and Timeline Seetings [APK Download and Teardown], Jan. 12, 2016 URL: http:// www.androidpolice. Com/2016/01/12/maps-v9-19 -introduces - new-driving-mode-with-traffic-updates -and-etas-audio-toggle-for- navigation- and-timeline-seetings-apk-download- teardown/.

Darrell Etherington: "Google Maps on Mobile Gets Uber Integration and More", May 6, 2014 URL: https//techcrunch.com /2014/05/06/google-maps-on-mobile- gets-uber-integration-and-more.

EESR issued in EP 16735494.3 dated May 18, 2018.

ISR and Written Opinion dated Jan. 11, 2018 in PCT/US2017/053514.

Written Opinion in PCT/US2018/046496 dated Aug. 5, 2019.

ISR and Written Opinion in PCT/US2018/046496 dated Nov. 28, 2019.

McLaren, Sharing Cities, MIT Press, 2015, pp. 21-69.

Edelman, Computing the Mind, Oxford University Press, 2008, pp. xi-36.

Wirth, Algorithms+Data Structures=Programs, 1976, pp. xii-55.

Lakoff, Metaphors We Live by, University of Chicago Press, 1980, pp. ix-55.

Goffman, Frame Analysis, Northeastern University Press, 1974, pp. 1-39, 301-344.

Gupta, Inside Bluetooth Low Energy, Artech House, 2013, pp. 119-130.

\* cited by examiner

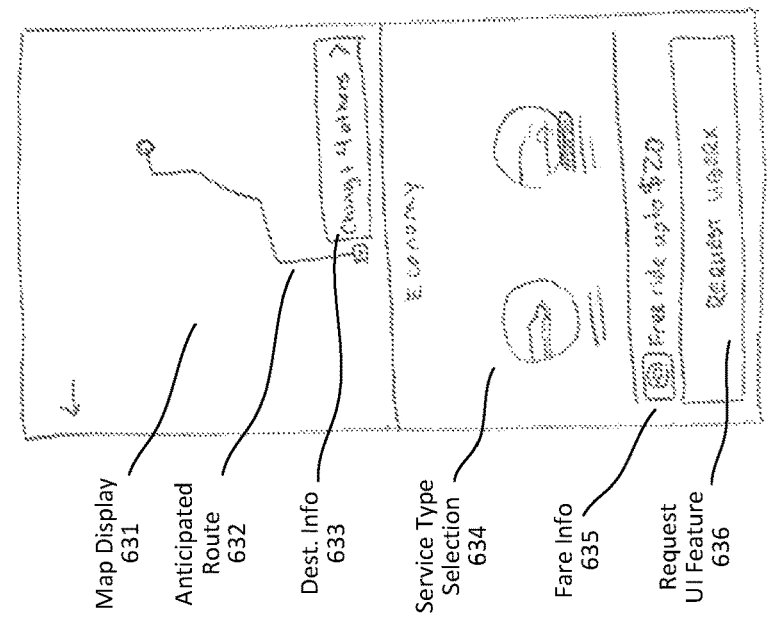
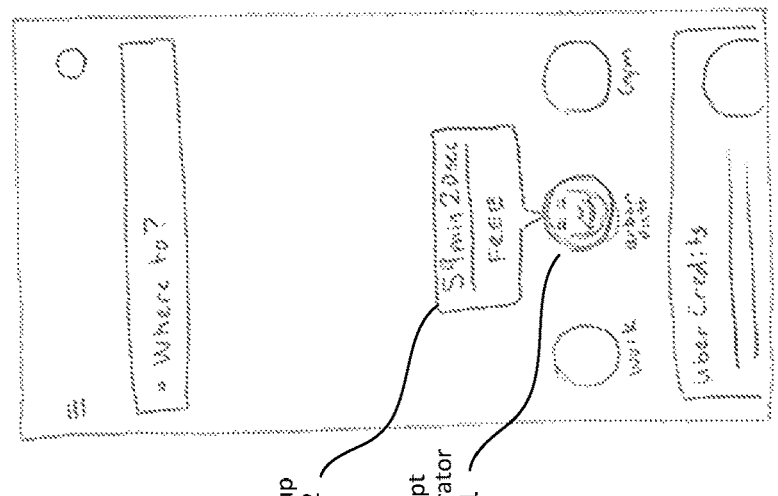
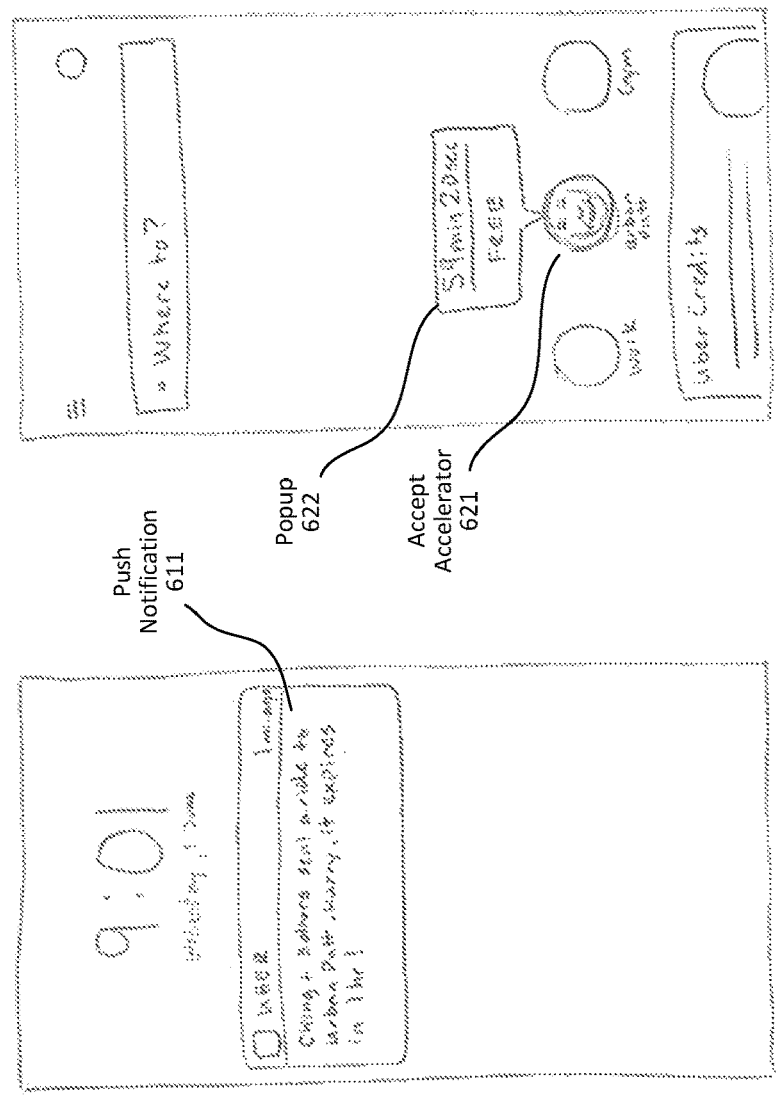

SYSTEM AND METHOD FOR GENERATING EVENT INVITATIONS TO SPECIFIED RECIPIENTS

BACKGROUND

Existing network services typically require a user to submit a service request corresponding to a service to be performed or fulfilled for the requesting user. The service request can indicate information such as a service location and a service time.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 6A to 6C are figures illustrating user interfaces related a gift conveyed from a set of users to a recipient user of the network service, according to examples described herein.

DETAILED DESCRIPTION

Figure 1:
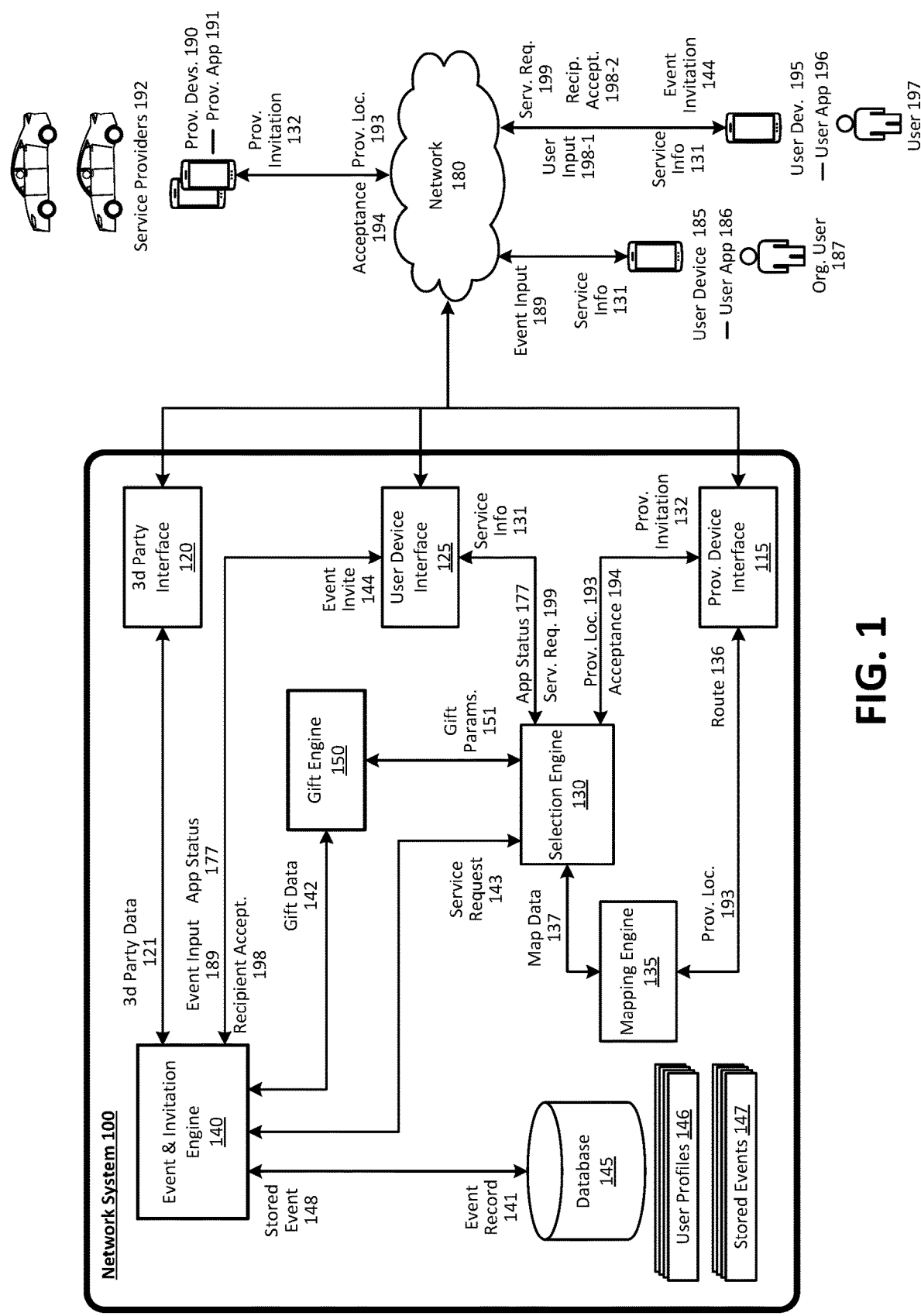
FIG. 1 is a block diagram illustrating an example network system in communication with user and provider devices, in accordance with examples described herein.

A network system is provided herein that manages an on-demand service linking service providers (e.g., drivers, couriers, autonomous vehicles (AVs), etc.) with requesting users throughout a given geographic region (e.g., a metroplex such as the San Francisco Bay Area). The network system can manage a pool of service providers over the given geographic region, each operating one or more computing devices ("provider devices"). In doing so, the network system can receive service requests from users via a designated user application executing on the users' mobile computing devices ("user devices"). The requested service can correspond to an on-demand transportation service, a delivery service, and the like. In response, the network system can identify one or more candidate service providers from the pool of service providers and transmit invitations to provider devices of the candidate service providers to invite the candidate service providers to fulfill the request for service. Upon receiving the invitation, the provider devices can display information relating to the request for service and the candidate service providers can choose to accept or reject the invitation via a designated service provider application executing on the provider devices. The provider devices transmit the responses to the network system. In response, the transport facilitation system can select one of the candidate service providers to fulfill the request for service.

In various aspects, the request for service can indicate a start location (e.g., a location at which the service provider is to rendezvous with the requesting user, a pickup location) and a service location (e.g., a location at which the requested service is completed, a drop-off location). Both locations can be entered by the requesting user as addresses, as names of entities such as restaurants, as cross streets, or other points of interest. In addition, the requesting user can interact with a map interface provided within the user application to set the start and service locations. Furthermore, the start location can be determined programmatically by the user device based on real-time location data generated by the user device (e.g., by a GPS subsystem of the user device). In this manner, the requesting user can set his or her current location as the start location. In addition, the service request can indicate a service time corresponding to a desired time at which the requested service is to be initiated or completed.

Examples described herein provide for a network system capable of generating event invitations targeted to specified recipients and transmitting details of said event invitations to one or more service providers such that requested services may be performed or fulfilled for the specified recipients. A user of the network services can create an event or otherwise cause the network system to generate event invitations to specified recipients who may or may not be existing users of the network service. The event can be a gathering, a meeting, a social outing, etc., and the event invitations can correspond to invitations for on-demand transport services to or from the event.

According to embodiments, the user creating the event—the organizing user—can create the event using the user application executing on the user's user device. The user can specify an event location associated with the event. The event location can be entered as an address, a name of a point of interest (e.g., an establishment, a restaurant, a hotel, a bar, a meeting space, a company), a set of coordinates (e.g., longitude and latitude), cross streets, and the like. The event location can also be specified by the user via inputs to an interactive map displayed on the user device (e.g., setting a pin on the interactive map). In addition, the event location can be set as the current location of the user as determined by a geo-aware resource (e.g., a GPS subsystem) of the user device. Furthermore, the event location can be retrieved from a third party source such as a calendar service that stores information relating to meetings and appointments for the user or a reservation service (e.g., event or dining booking services). In addition, the user can further specify one or more event times associated with the event. The one or more event times can indicate when the event is scheduled to begin or end. The one or more event times can further indicate a time for the service invitations to be transmitted to the specified recipients and/or a time for the requested services to be performed for the specified recipients.

According to some examples, the user organizing an event can be an ordinary user of the network service, capable of submitting service requests using the user application. Thus, a user of the network service can create an event such that service invitations can be transmitted to specified recipients who are peers of the user (e.g., other users of the network service). Events created by ordinary users can be referred to as "peer events." Examples of peer events can include a group of friends deciding to meet at a restaurant or a bar to socialize. In other examples, the organizing user can be associated with a non-ordinary status (e.g., event organizer, event curator) with respect to the network service. Such users may be presented with different user interfaces when using the user application as compared with ordinary users. Alternatively, such users may utilize a different user application (e.g., an organizer application) to create events. Such users can include individuals associated with an establishment (e.g., owner or employee of a restaurant), individuals tasked to organize events in a specific area (e.g., event curators), or an administrator of the network service. Events created by non-ordinary users can be referred to as "curated events." Examples of curated events can include a restaurant owner creating a happy hour event to cause service invitations to be transmitted to specified customers of the restaurant. Some events may be visible and searchable within the user application for all users of the network services. Other events may only be visible and searchable for specified recipients of those events.

In an example, an event can be created by an organizing user based on the organizing user's location and/or destination. For instance, event location for a created event can be determined based on location data received from the organizing user's device. Furthermore, the organizing user can create an event while a service is being rendered for the organizing user. In such a scenario, the event location can be determined based on the service location of the service being rendered for the organizing user.

According to one implementation, the network system can generate and transmit event invitations to the specified recipients. In some examples, an event can be planned ahead of time and event invitations can be transmitted contemporaneously or after the creation of the event. Reminders and notifications may be transmitted to the specified users at appropriate times. In other examples, an event being created by the organizing user can correspond to an event beginning or occurring at that particular moment in time. In these examples, event invitations can be transmitted contemporaneously with the creation of the event. In some implementations, the organizing user can specify a time at which event invitations can be transmitted to specified users (e.g., two days before the occurrence of the event). The transmission time can also be determined programmatically by the network system.

In some cases, the recipients are registered users of the network service. In such cases, event invitations can be transmitted as push notifications to the recipient devices. The event invitations can cause the user application executing on a recipient device to display information relating to the event. In other cases, one or more recipients are not registered users of the network service. In such cases, the recipients may not have installed the user application on the recipient's device and the event invitations can be transmitted as text messages, via a third party messaging platform, or as email messages. A text or email message corresponding to an event invitation can include a hyperlink to a webpage that displays information relating to the event, a hyperlink to download and install the user application, and/or a hyperlink to register as a user of the network service.

According to embodiments, event invitations can include data indicating details of the event, including one or more service times associated with the event, the event location, list of the recipients invited to the event, a description of the event, a gift associated with the event indication, a message from the organizing user to the recipients (e.g., individualized messages or one message for all recipients), and the like. A recipient can choose to accept or ignore the event invitation. If the recipient accepts the event invitation (e.g., via the user application corresponding to the network service), the recipient device can be caused to transmit a recipient acceptance to the network system.

In certain implementations, in response to receiving the recipient acceptance, the network system can determine a time at which service for the recipient is required. For instance, if the recipient acceptance corresponds to an event occurring contemporaneously, the network system can treat the recipient acceptance as a service request for service as soon as possible. The recipient can be prompted with a notification informing the user that service (e.g., transport service to the event) is to be immediately rendered. On the other hand, if the recipient acceptance corresponds to an event occurring in the future, the network system can prompt the recipient, via the user application, to enter a desired time to rendezvous with a service provider. The network system may also automatically determine the time for rendering the service based on information relating to the event (e.g., a start time) and other information (e.g., historical traffic data).

In rendering services to the specified recipients, the network system can operate in a similar fashion as if individual service requests were received from the specified recipients. In particular, for each specified recipient, the network system can determine a start location (e.g., a location at which the specified recipient is to rendezvous with a service provider), identify one or more service providers, transmit provider invitations to the identified service providers, and receive provider acceptances in response to the provider invitations, and select an optimal service provider to provide the requested service for the specified recipient. One or more aspects of such services can be specified by the organizing user. For instance, the service location for each instance of service rendered for the recipients can be the event location. In some implementations, the network system can improve efficiencies in managing service providers by grouping specified recipients such that a single service provider can provide services to two or more specified recipients. The grouping of the specified recipients can be performed based on their respective locations, desired times of service, and service locations.

In certain examples, the organizing user and/or the specified recipients can receive invitation information relating to the recipient's acceptances of the event invitations and/or service information relating to the services to be rendered for the specified recipients. For example, the organizing user and/or the recipients can view a list of (i) recipients invited, (ii) recipients who have accepted the event invitation, and/or (iii) recipients who are present at the event (e.g., based on services rendered for recipients, location data received from recipient devices, user input ("check ins"), etc.). The organizing user and/or the recipients can further receive information such as service progress information, including estimated times of arrival of each recipient at the event location. For some open-to-public events, the network system can control the sharing of data such that recipients are only able to view service information relating to other users to whom they are connected. For instance, via the user application, a recipient can view invitation information and/or service information relating to acquaintances or friends of the recipient but not of other users of the network service. In one example, the recipient can view a map feature within the user application showing the real-time locations, routes, and estimated times of arrival at the event location of one or more other recipients of the event invitation (e.g., other recipients sharing location information with the recipient).

In certain examples, a particular recipient of an event invitation can, through interactions with the user application, cause notifications regarding his or her progress to the event location to be transmitted to other recipients of the event invitation. In this manner, the particular recipient can notify other specified recipients that he or she is on her way to the event location. The notification message can further include information to encourage the other recipients to accept the event invitation or request an on-demand transport service to the event location. The notification message can further include ETA information of the particular recipient.

According to embodiments, the organizing user and/or recipients can specify a denomination corresponding to a gift to be applied to services rendered in association with an event. For instance, an organizing user such as the owner of a bar can create a happy hour event and invite specified recipients such as a group of patrons to the event. The owner can specify a certain gift denomination to be applied to transport services for the specified recipients arriving at or leaving the event. The gift denominations can be geo-fenced and time-bound to the event. For instance, a recipient may redeem the gift denomination for an on-demand transport service only if the service location of the transport service is the event location and if transport service was fulfilled during a valid time window that coincides with the event time. In addition, the gift denomination can be specific to a sub-set of the recipients (e.g., those who live far away from the event location). Further, one sub-set of the recipients can receive a different gift denomination as compared with another sub-set of the recipients. In addition, the distribution of the cost of the conveyed gifts can be varied. For instance, the organizing user can choose to bear all the costs. In other examples, the organizing user can request contribution or sharing of the costs related to the conveyed gifts and discounts from other users or recipients. In addition, any group of users of the network system (including or not including the organizing user) can pool together to convey a gift to another user of the network.

In certain examples, a user of the network system receiving a gift is provided one or more notifications (e.g., a push notification, a user interface feature within the user application, etc.) on that user's user device. The notification can inform the user receiving the gift of the denomination of the gift and any geographic or time limitations associated with the gift. In addition, the notification can inform the user of a message from the organizing user of the event and/or other users who contributed to the gift. The user device can display one or more user interface features (e.g., an accelerator, an icon, a shortcut, etc.) that enables the user receiving the gift to quickly redeem the gift with an input (e.g., a touch input, a select input, etc.). Redemption of the gift via the one or more user interface features can include submitting a service request that complies with the limitations (e.g., geographic limitation) of the conveyed gift and applying the gift to the requested service. For instance, an input by the user receiving the gift via the one or more user interface features can cause the user device to transmit, to the network system, a service request indicating a service location specified by the conveyed gift. The service request can further indicate that the request is transmitted pursuant to a conveyed gift. The network system, upon receiving the service request, can automatically apply the gift (e.g., a fixed monetary credit) towards the requested service. The one or more user interface features can include an icon representative of the event location (e.g., icon of a restaurant) or of one or more users who contributed to the gift (e.g., photo(s) of the one or more users).

In one example, the network system is capable of associating a service request from a recipient with the event based on the identity of the recipient (e.g., if the recipient was invited to the event), a service location, and a service time associated with the service request, even if the recipient does not accept or otherwise respond to an event invitation. The recipient can be prompted for an input regarding whether he or she is requesting the service to attend the event. In this manner, the network system can update service information and/or apply a gift denomination to the recipient's requested service even if the recipient missed the event invitation.

Among other benefits, the network system described herein allow for improved integration and streamlining between event creation and invitation of users to the created events. By allowing one or more users to cause invitations to be transmitted to a group of recipients, the user experience to request services related to the created events is vastly simplified and improved. In addition, by programmatically facilitating services to be performed in connection with created events, the network system can achieve reduced user data traffic at or around the time of the created events. For instance, users no longer have to tie up valuable network resources viewing, selecting, and requesting services around the time of the event since the services will be automatically arranged ahead of time based on information associated with the event. Furthermore, by enabling organizing users and other users to convey gifts or discounts to recipients, the user experience and participation rate relating to services rendered in connection with events are improved.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Descriptions

FIG. 1 is a block diagram illustrating an example network system in communication with user and provider devices, in accordance with examples described herein. The network system 100 can manage a network service that connects requesting users 197 with service providers 192 that are available to service the users' service requests 199. The network service can provide a platform that enables on-demand services (e.g., a transportation service, a ride-sharing service, a delivery service, etc.) between a requesting user 197 and available service providers 192 by way of a user application 196 executing on the user devices 195, and a service provider application 191 executing on the provider devices 190. As used herein, a user device 195 and a provider device 190 can comprise a computing device with functionality to execute a designated application corresponding to the network service managed by the network system 100. In many examples, the user device 195 and the provider device 190 can comprise mobile computing devices, such as smartphones, tablet computers, VR or AR headsets, on-board computing systems of vehicles, smart watches, and the like.

The network system 100 can include a user device interface 125 to communicate with user devices 195 over one or more networks 180 via a user application 196. According to examples, a requesting user 197 wishing to utilize the network service can launch the user application 196 and transmit a service request 199 over the network 180 to the network system 100. In certain implementations, the requesting user 197 can view multiple different service types managed by the network system 100, such as a basic ride-share service, an economy service, a luxury service, a professional service provider service (e.g., where the service provider is certified), a self-driving vehicle transport service, and the like. The network system 100 can utilize the service provider locations 193 to provide the user devices 195 with ETA data of proximate service providers for each respective service. For example, the user application 196 can enable the user 197 to scroll through each service type. In response to a soft selection of a particular service type, the network system 100 can provide ETA data on a user interface of the user app 196 that indicates an ETA of the closest service provider for the service type, and/or the locations of all proximate available service providers for that service type. As the user scrolls through each service type, the user interface can update to show visual representations of service providers for that service type on a map centered around the user 197 or a start location set by the user. The user can interact with the user interface of the user application 196 to select a particular service type, and transmit a service request 199.

In certain implementations, the user device interface 125 can receive user input 198-1 and user application status 177 from the user devices 195 over the network 180. User interactions with the user application 196, including with any content displayed therein, can be transmitted as user inputs 198-1. Such inputs can include selections, text inputs, swipes, gestures, uploads, and the like. User application status 177 can correspond to signals or data indicating a status of the user application 196. For instance, when the user 197 first opens the user application 196, the user application 196 can cause the user device 195 to transmit a synchronization signal indicating that the user application is open.

In some examples, the service request 199 can include a start location within a given region (e.g., a metropolitan area managed by one or more datacenters corresponding to the network system 100) at which a matched service provider 192 is to rendezvous with the requesting user 197. The start location can be inputted by the user by setting a location pin on a map interface of the user application 196, or can be determined by a current location of the requesting user 197 (e.g., utilizing location-based resources of the user device 195). Additionally, the requesting user 197 can further input a service location during or after submitting the service request 199.

In various implementations, the network system 100 can further include a selection engine 130 to process the service requests 199 in order to identify one or more service providers 192 to service the service request 199. The network system 100 can include a provider device interface 115 to communicate with the provider devices 190 via the service provider application 191. In accordance with various examples, the provider devices 190 can transmit real-time location information using geo-aware resources of the provider devices 190 (e.g., GPS or GLONASS). These service provider locations 193 can be utilized by the selection engine 130 to identify a set of candidate service providers 192 that can service the service request 199. The set of candidate service providers 192 can be identified based on an ETA to the service location, a provider type (e.g., luxury service provider, economy service provider), etc. In certain implementations, the network system 100 can also identify an autonomous vehicle (AV) to service the service request 199. Thus, the pool of proximate candidate service providers in relation to a start location can also include one or more AVs operating throughout the given region.

Once one or more candidate service providers 192 are identified by the selection engine 130, the selection engine 130 can generate provider invitations 132 to each of the one or more candidate service providers 192. Upon receiving the provider invitations 132, the one or more candidate service providers 192 can accept or decline the provider invitations 132 via the service provider application 191. Upon receiving acceptances 194 from the provider devices 190, the selection engine 130 can select one of the candidate service providers 192 who submitted an acceptance to fulfill the service request 199.

In some aspects, the network system 100 can include a mapping engine 135, or can utilize a third-party mapping service, to generate map data 137 and or traffic data in the environment surrounding the start location. The mapping engine 135 can receive the service provider locations 193 and input them onto the map data 137. The map data 137 can be utilized by the selection engine 130 to identify the one or more candidate service providers 192 that are located near the start location. In addition, the mapping engine 130 can generate a route 136, including turn-by-turn directions, for transmission to the service provider 192 selected to fulfill the service request 199. The route 136 can include route segments from the current location of the service provider 192 to the start location, from the start location to the service location, etc. The route 136 can further include route guidance to intermediary stops for certain service requests (e.g., intermediate stop to pick up or drop off another ride sharing passenger).

In various implementations, the network system 100 can further include a database 145 storing user profiles 146 including historical information specific to the individual users 197 of the on-demand network service. Such information can include user preferences of service types, routine routes, start locations, and service locations, work addresses, home addresses, addresses of frequently used service locations (e.g., a gym, grocery store, mall, local airport, sports arena or stadium, concert venue, local parks, and the like).

According to embodiments, the network system 100 includes an event and invitation engine 140 to create events and transmit event invitations to specified recipients. For example, an event can be created by an organizing user 187. The organizing user 187 can do so via the user application 186 executing on the user device 185 operated by the organizing user 187. As an alternative, the organizing user 187 can create the event via a dedicated application executing on the user device 185. The network system 100 can receive event input 189 from the user device 185 to create an event record. Third party data 121 can also be received from a third party service (e.g., a calendar service) in creating the event. Third party data 121 can be received via a third party interface 120. For instance, the network system 100 can, via the third party interface 120, receive data such as a guest list, location, time, and other information relating to the event from a third-party calendar service. The created event record 141 can be stored in the database 145 to be stored along with a plurality of other event records 147.

In certain implementations, the event input 189 can specify a gift or discount to be applied to subsequent services provided for recipients in connection with the created event. In response, the event and invitation engine 140 can generate gift data 142 corresponding to details of the gift or discount to the gift engine 150. Gift data 142 can indicate a denomination (e.g., fixed value gift or discount, percentage discount, etc.) associated with the gift. Gift data 142 can also indicate a geographic or location limit and a time limit for the gift. For instance, the gift can be valid only for rendered services having a service destination that is within a certain distance from the event location. In addition, the gift can further be constrained based on time. For instance, the gift can be eligible to be redeemed or applied only for services rendered contemporaneously with or at a time around the time of the created event. The gift engine 150 can be configured to generate gift parameters 151 to be transmitted to the selection engine 130 such that the services rendered can be verified for gift eligibility.

After the creation of the event, the event and notification engine 140 can transmit event invitations to each of the specified recipients. The specified recipients can include user 197 of the network service. Accordingly, user device 195 operated by the user 197 can receive event invitation 144. The event invitation 144 can cause the user device 195 to display a notification regarding the created event. The user 197 can be prompted to accept, decline, or ignore the event invitation 144.

If the user 197 chooses to accept the event invitation 144, a recipient acceptance 198-2 can be transmitted by the user device 195 to the network system 100, and in particular, the event and invitation engine 140. In response, the event and invitation engine 140 can generate a service request 143 requesting for services to be rendered for the user 197. Some of the information in the service request 143 can be determined based on the data corresponding to the event (e.g., event record 141). For instance, the event and invitation engine 140 can determine the event location to be the service location. In other examples, the event and invitation engine 140 is configured to generate the service request 143 at an appropriate time based on the event time (e.g., a start time) and a user preference or input in connection with the event (e.g., arrive just before the event starts). The event and invitation engine 140 can do so based on stored event 148 received from the database 145. For instance, the event and invitation engine 140 can generate the service request 143 at an appropriate time based on the stored event 148 that indicates a desired time of arrival at the service location, traffic information, and the like. In response to the service request 143, the selection engine 130 can select a service provider 192 and transmit an invitation to the selected service provider to fulfill the requested service for the user 197.

In certain implementations, the network system is configured to provide service information to the organizing user 187 and/or recipients. For instance, the network system can generate service information 131 that can indicate an estimated time of arrival of one or more of the recipients. Service information 131 can also indicate recipients who accepted or declined the invitation. In addition, service information 131 can indicate which of the recipients have already arrived at the event location for the event. In this manner, the organizing user as well as recipients can easily view the status of the event and, in particular, the status of other recipients arriving at the event.

Methodology

Figure 2:
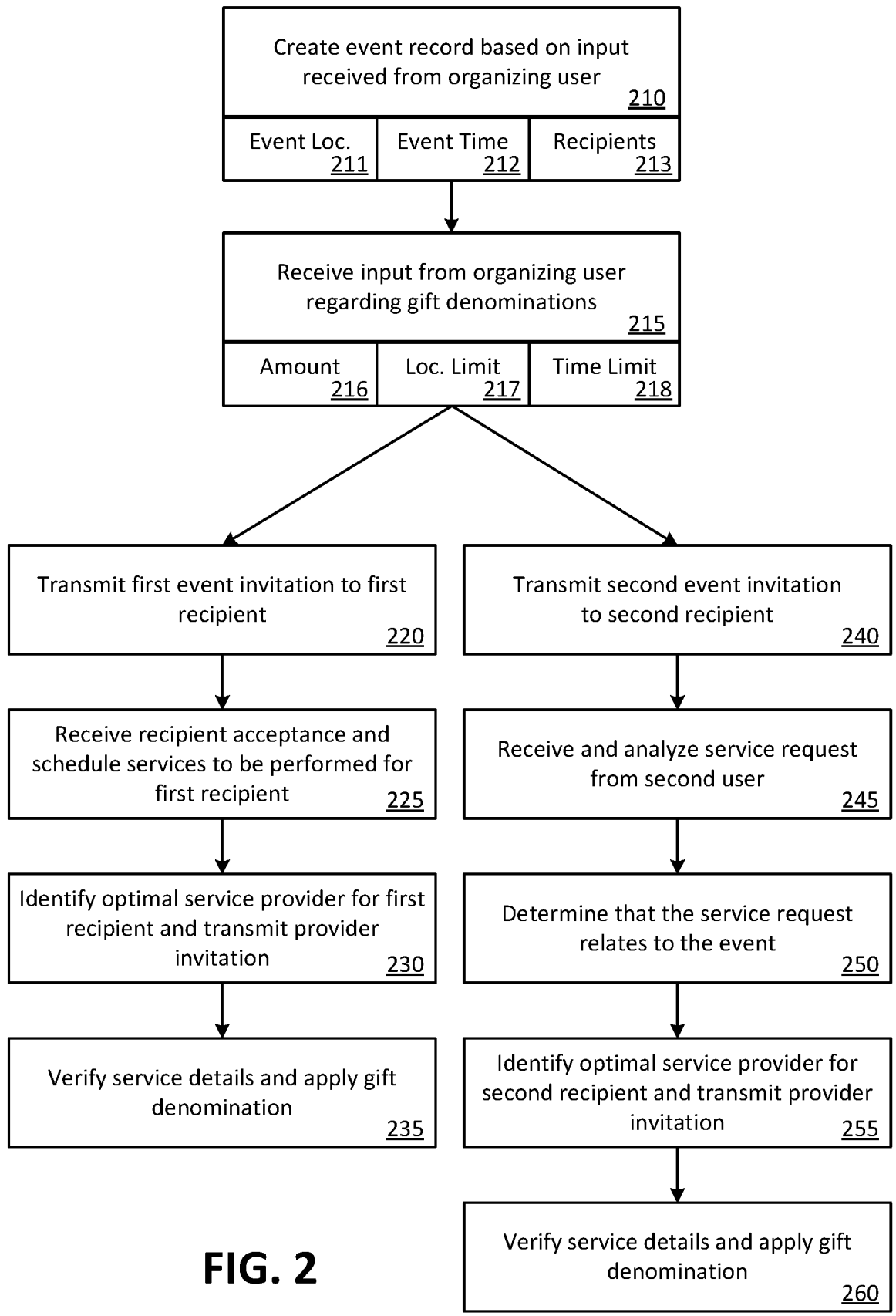
FIG. 2 is a flow chart describing an example method of generating event invitations and processing recipient responses, according to examples described herein.

FIG. 2 is a flow chart describing an example method of generating event invitations and processing recipient responses, according to examples described herein. In the below discussion of FIG. 2, reference may be made to features and examples shown and described with respect to FIG. 1. For instance, The method illustrated in FIG. 2 may be implemented and performed by the network system 100 of FIG. 1.

The network system can be configured to create an event record based on an organizing user's input (210). The input from the organizing user can include an event location (211), an event time (212), and recipients to whom event invitations will be transmitted (213). The organizing user can provide inputs to create the event via the user application associated with the network service. As an alternative, the organizing user can provide the inputs via a dedicated event organizer application or a set of dedicated user interfaces within the user application. The event time can include information regarding an event start time, a duration, and an end time. In addition, the event organizer can specify when the network system should transmit event invitations to the recipients (e.g., immediately, five days before the event, etc., an hour before the event, etc.). The organizing user's input can be transmitted via a network to the network system and the record corresponding to the event can be stored in a database of the network system.

The network system can further receive, via the network, input from the organizing user regarding a gift denomination to be applied to services rendered for one or more recipients in association with the event (215). The gift can be a fixed amount discount or a percentage discount to be applied to a service. The cost of the gift can be shared among a plurality of users of the network service. For instance, the organizing user can request one or more other users of the network service to share the cost of the gift. The input regarding the gift denomination can include an amount (216), a location limit (217), and a time limit (218). The location limit can specify a geo-fence around the event location for which the gift can be applied to services. For instance, a service rendered for a recipient having a service location within the geo-fence can be eligible for having the gift applied whereas another service rendered having a service location outside the geo-fence can be ineligible to receive the gift. In another example, the geo-fence can be recipient-specific. For instance, a restaurant or a bar can specify a closing time gift denomination to be applied to services to transport patrons to their respective homes. Accordingly, each recipient can have a different geo-fence applied. Similarly, the time limit can specify a time duration during which the gift can be applied. In many instances, the time limit can coincide or be contemporaneous with the event time. In this manner, the gift can be geo-fenced and time-bound to the event created by the organizing user.

At the appropriate times, the network system can transmit a respective event invitation to each recipient. For instance, the network system can transmit a first event invitation to a first recipient (220). The event invitation can include information regarding the event to be conveyed to the recipient. For instance, the event invitation can include information regarding the event location, event time, any associated gift denominations, expected total cost of service related to the event, other recipients of event invitations, etc. In response, the first recipient can accept the event invitation and cause a recipient acceptance to be transmitted to the network system. The network system can receive the acceptance and schedule services to be performed for the first recipient (225). In some examples, services can be scheduled for a future time. In other examples where the event is contemporaneously occurring with the receipt of the acceptance, the service can be scheduled for immediate performance. In either case, the first recipient can be prompted for confirmation before a service provider is invited to perform the requested service.

At the scheduled time for service performance, the network system can identify an optimal service provider for the first recipient from a pool of service providers (e.g., based on location, ETA from a start or rendezvous location, a service class, etc.) and a provider invitation can be transmitted to the device operated by the optimal service provider (230). Upon receiving a provider acceptance from the optimal service provider in response to the provider invitation, the network system can transmit information such as routing data to the optimal service provider to enable the optimal service provider to render the service for the first recipient. If the optimal service provider does not accept the provider invitation, another service provider can be identified to receive the provider invitation. After the service is complete, the network system can verify the details of the service (e.g., starting location, service location, time of service, etc.) to determine whether the service rendered for the first recipient is eligible to have the gift denomination applied (235).

The network system can further transmit a second event invitation to a second recipient (240). In contrast with the first recipient, the second recipient does not explicitly accept the event invitation via the user application executing on the device of the second recipient. For example, the second recipient may miss the notification regarding the event indication. Instead, the second recipient independently submits a service request. The network system receives and analyzes the service request from the second user (245). The network system is configured to determine and confirm that the received service request corresponds to the event created at step 210 (250). The network system can do so by determining that the second recipient is one of the recipients specified by the organizing user at step 213. The network system can also determine that the service location associated with the service request is the event location (or within a certain distance of the event location). In addition, the network system can determine that the desired service time associated with the service request is contemporaneous with or around the time of the event. In response to these determinations, the network system can prompt the second recipient to confirm that the service request is associated with the event created at step 210. The network system can further identify an optimal service provider for the second recipient and transmit a provider invitation to the optimal service provider (255). After the completion of the service for the second recipient, the network system can verify the service information associated with the request to determine whether the gift denomination specified by the organizing user is applicable (260).

According to embodiments, the network system can identify a single optimal service provider to provide service for two or more of the recipients. Because the services for the recipients can be scheduled ahead of time and often share common characteristics (e.g., same service location, same start location, etc.), managing service providers in this manner enables the network system to more effectively manage resources.

Figure 3:
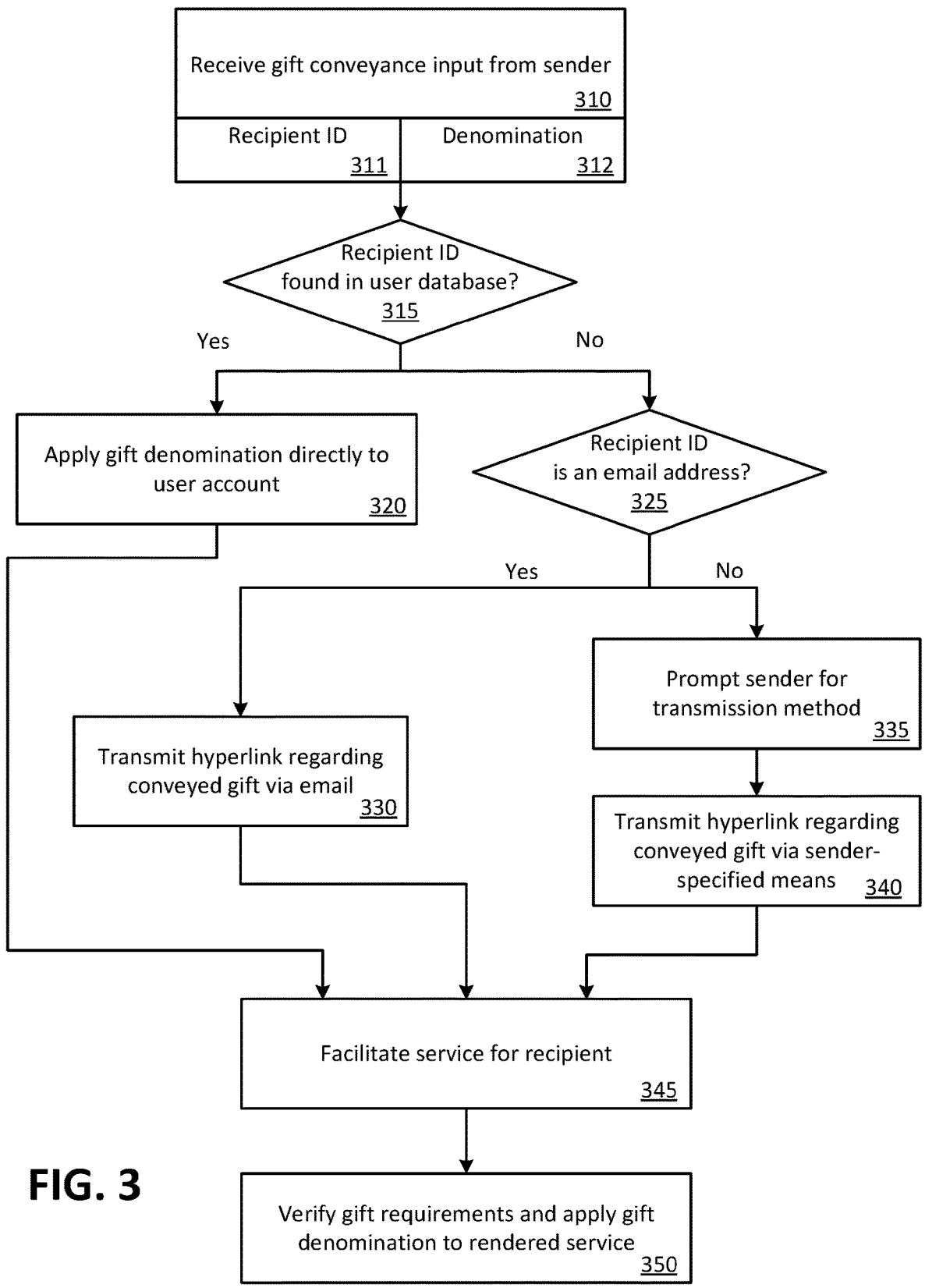
FIG. 3 is a flow chart describing an example method of conveying and applying gifts or discounts associated with the network service from a sender to a recipient, according to examples described herein.

FIG. 3 is a flow chart describing an example method of conveying and applying gifts or discounts associated with the network service from a sender to a recipient, according to examples described herein. In the below discussion of FIG. 3, reference may be made to features and examples shown and described with respect to FIG. 1. For instance, the method illustrated in FIG. 2 may be implemented and performed by the network system 100 of FIG. 1.

Referring to FIG. 3, the network system receives gift conveyance input from the sender of the gift (310). The input can specify a recipient ID that can be an email address, a phone number, a username, and the like (311). The input can also specify a denomination (312) such as a fixed gift amount or a percentage discount to be applied for a future service. In response, the network system can verify whether the recipient ID corresponds to a registered user of the network service (315). The network system can do so by querying a user database. If the recipient ID corresponds to a registered user of the network service, the network system can directly apply the gift denomination to the recipient's user account (320). The gift can then be automatically applied the next time service is rendered for the recipient.

If the recipient ID does not correspond to a registered user of the network service, the network system checks if the recipient ID is an email address (325). If the recipient ID is an email address, a hyperlink regarding the conveyed gift is transmitted via email to the email address of the recipient (330). The hyperlink can link to a webpage that displays information regarding the conveyed gift, the denomination, and any eligibility requirements. The linked webpage can also display features to register the recipient as a user of the network service and can display a link to download the user application associated with the network service. Upon registering for an account with the network service using the transmitted link, the gift denomination can be automatically applied to the newly-established user account.

If the recipient ID does not correspond to an email address, the network system can prompt the sender of the gift to specify a means to transmit the gift to the recipient (335). The network system can do so by causing the user application to display a share sheet that displays a plurality of available transmission or sharing options. By selecting one of the options, the sender's device or the network system can transmit the hyperlink corresponding to the gift conveyance to be transmitted via a messaging service or via an application installed on the sender's device (340). In some examples, the hyperlink can be transmitted via a text messaging service (e.g., SMS, MMS) or via a third party messaging service.

After the gift denomination is applied to the user account, the network system can facilitate a service for the user (345). After (or before) the completion of the services, the network system can verify the gift requirements against the rendered services to ensure that eligibility requirements attached to the gift denomination are met (e.g., geo-fence and time requirement). If these requirements are met, the network system can cause the gift denomination to be applied towards the services rendered for the user (350).

Hardware Diagram

Figure 4:
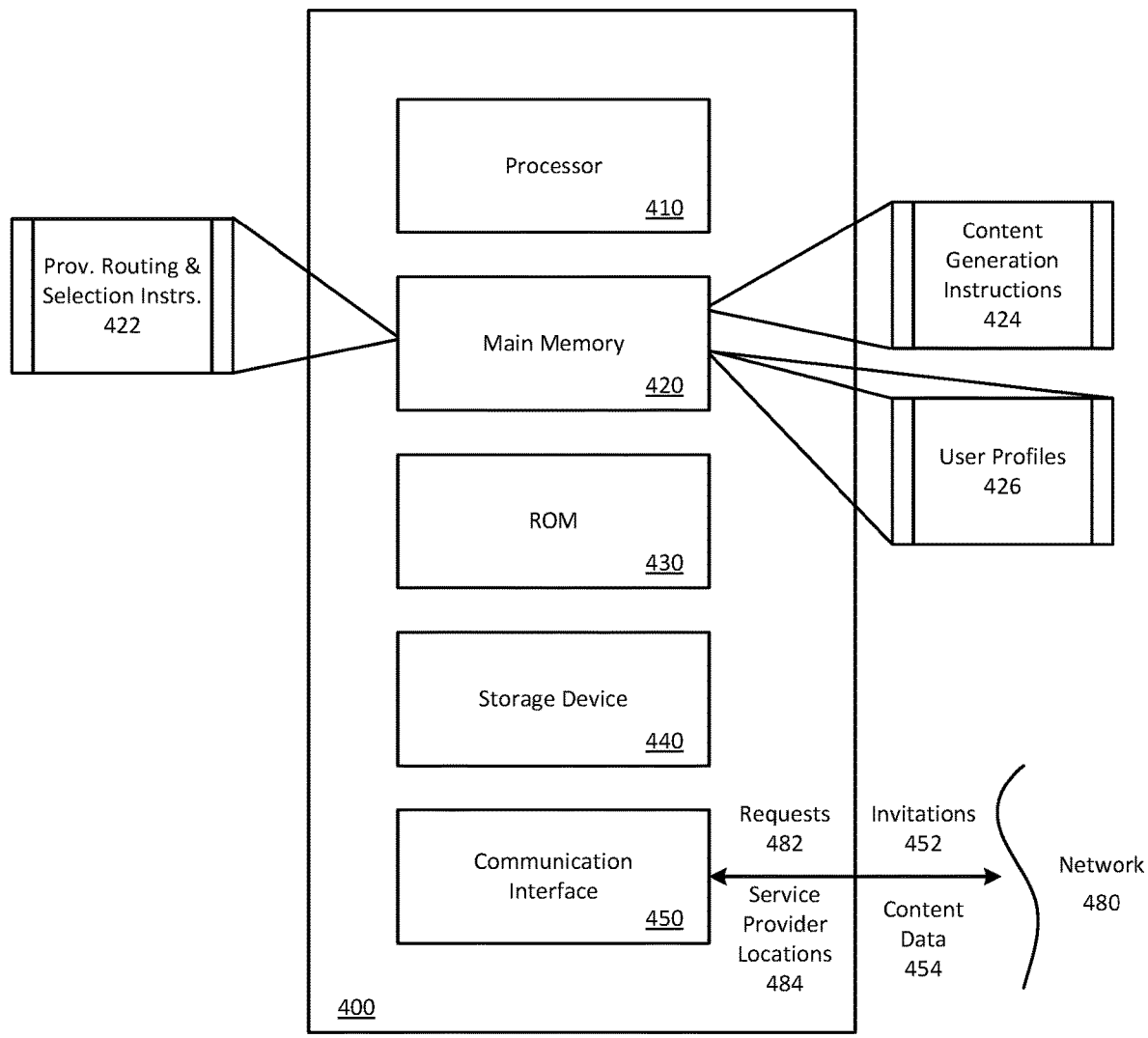
FIG. 4 is a block diagram that illustrates a computer system upon which examples described herein may be implemented.

FIG. 4 is a block diagram that illustrates a computer system upon which examples described herein may be implemented. A computer system 400 can be implemented on, for example, a server or combination of servers. For example, the computer system 400 may be implemented as part of a network service, such as described in FIGS. 1 through 5. In the context of FIG. 1, the network system 100 may be implemented using a computer system 400 such as described by FIG. 4. The network system 100 and may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate with one or more networks 480 (e.g., cellular network) through use of the network link (wireless or wired). Using the network link, the computer system 400 can communicate with one or more computing devices, one or more servers, one or more databases, and/or one or more self-driving vehicles. In accordance with examples, the computer system 400 receives requests 482 from mobile computing devices of individual users. The executable instructions stored in the memory 430 can include provider routing and selection instructions 422, which the processor 410 executes to determine an optimal route and select a service provider to service the request 482.

The executable instructions stored in the memory 420 can also include content generation instructions 424, which enable the computer system 400 to access user profiles 426 and other user information in order to select and/or generate user content 454 for display on the user devices. By way of example, the instructions and data stored in the memory 420 can be executed by the processor 410 to implement an example network system 100 of FIG. 1. In performing the operations, the processor 410 can receive requests 482 and service provider locations 484, and submit invitation messages 452 to facilitate the servicing of the requests 482. The processor 410 is configured with software and/or other logic to perform one or more processes, steps and other functions described with implementations, such as described by FIGS. 1 to 4, and elsewhere in the present application.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Device

Figure 5:
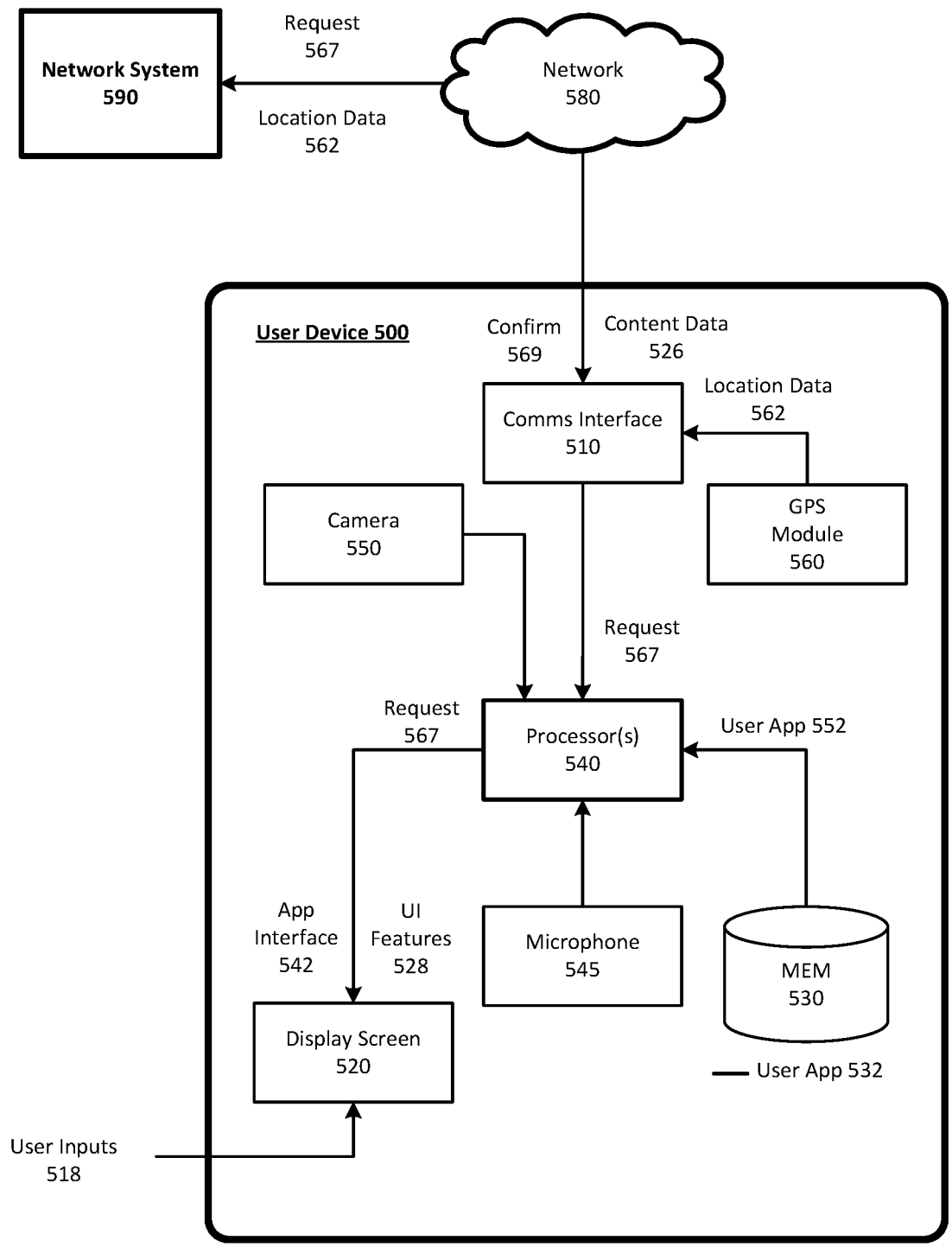
FIG. 5 is a block diagram illustrating an example user device executing and operating a designated user application for communicating with a network service, according to examples described herein.

FIG. 5 is a block diagram illustrating an example user device executing and operating a designated user application for communicating with a network service, according to examples described herein. In many implementations, the user device 500 can comprise a mobile computing device, such as a smartphone, tablet computer, laptop computer, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store a designated application (e.g., a user app 532) in a local memory 530. In variations, the memory 530 can store additional applications executable by one or more processors 540 of the user device 500, enabling access and interaction with one or more host servers over one or more networks 580.

In response to a user input 518, the user app 532 can be executed by a processor 540, which can cause an app interface 542 to be generated on a display screen 520 of the user device 500. The app interface 542 can enable the user to, for example, view available items offered by nearby entities. In various implementations, the app interface 542 can further enable the user to enter or select a service location (e.g., by entering an address, performing a search, or selecting on an interactive map). Furthermore, the app interface 542 can display dynamically determined values associated with the available items. The user can generate a request 567 via user inputs 518 provided on the app interface 542. For example, the user can select one or more items from the available items in requesting the network service. In some examples, the app interface 542 can display one or more suggested or recommended items that are identified by the network system based on information specific to the user (e.g., user profile information).

As provided herein, the user application 532 can further enable a communication link with a network system 590 over the network 580, such as the network system 100 as shown and described with respect to FIG. 1. The processor 540 can generate user interface features 528 (e.g., map, request status, content cards, etc.) using content data 526 received from the network system 590 over network 580. Furthermore, as discussed herein, the user application 532 can enable the network system 590 to cause the generated user interface 528 to be displayed on the application interface 542.

The processor 540 can transmit the requests 567 via a communications interface 510 to the backend network system 590 over a network 580. In response, the user device 500 can receive a confirmation 569 from the network system 590 indicating the selected service provider that will service the request 567. In various examples, the user device 500 can further include a GPS module 560, which can provide location data 562 indicating the current location of the requesting user to the network system 590 to, for example, establish the service location.

According to embodiments, the app interface 542 can further display user interface features indicating or representing a current status of the request for service. For instance, the app interface 542 can display a progress bar indicating the current status of the user's request. The app interface 542 can also display useful information such as an estimated time of arrival of the selected service provider at the service location. In addition, the user can enter, via the app interface 542, information that may be relevant to the selected service provider such as a building entry access code, an intercom number or code, a contact phone number of the user, a cross-street etc.

User Interface Examples

FIGS. 6A to 6C are figures illustrating user interfaces related to a gift conveyed from a set of users to a recipient user of the network service, according to examples described herein. The gift conveyed from the set of users to the recipient user can be associated with an event created by an organizing user, as described herein. The gift can be accepted and redeemed for a service requested by the recipient user.

Referring to FIG. 6A, the network system (e.g., network system 100 of FIG. 1) can transmit a notification regarding the conveyed gift to the user device of the recipient user. The notification can cause the user device to display push notification 611 on the screen of the user device. The push notification 611 can display information regarding the identity (e.g., names, nicknames, other identifiers) of set of users who conveyed the gift to the recipient user. The push notification 611 can further display information regarding the geographic limitation (e.g., a pre-selected service location) and a temporal limitation associated with the gift. The geographic limitation, including the pre-selected service location, can be set by the set of users. The pre-selected service location can be an entity location or a location of one or more of the set of users.

The recipient user can select or interact with the push notification 611 to be presented with the user interface shown in FIG. 6B. The user interface of FIG. 6B can include an accept accelerator 621 to quickly accept the conveyed gift. The accept accelerator 621 can include an identification of a pre-selected service location associated with the conveyed gift (e.g., a name of an entity, a name of a user of the set of users, etc.). The accept accelerator 622 can also display a graphical icon representative of the pre-selected service location (e.g., a photo of a user of the one or more users, a photo of the entity, etc.). A popup 622 can also be displayed along with the accept accelerator 621. The popup 622 can display information related to the temporal limitation of the conveyed gift (e.g., a time remaining until the convey gift expires) and a cost associated with a service request (e.g., a cost of requested service to the pre-selected service location after applying the conveyed gift).

The recipient user can interact with the accept accelerator 621 (e.g., via a tap gesture touch input) to arrive at the user interface of FIG. 6C. The user interface of FIG. 6C can represent a confirmation of parameters associated with a service request prior to requesting the service. The confirmation user interface of FIG. 6C can include a map display 631 that includes an anticipated route 632 and destination information 633. The destination information 633 can include the names or identity of the set of users who conveyed the gift to the recipient user. The destination information 633 can further include an address of the service location or a name of an entity. In addition, the confirmation user interface can include a service type selection 634 that allows the recipient user to select between different types (or classes) of service. Types of service can include an economy service type, a luxury service type, a certified service type (e.g., where the service provider is certified by a governing authority), a service type catering to handicapped users, a ride-pooling service type, etc. The confirmation user interface can further include fare information 635 displaying a cost associated with the service request, including the effect of the conveyed gift (if any). In addition, the confirmation user interface can include a request user interface feature 636. The recipient user can interact with the request user interface feature 636 to submit a service request to the network system 100.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system comprising:
one or more processors; and
one or more memory resources storing instructions that, when executed by the one or more processors, cause the network system to:
receive, from an organizing user device of an organizing user, a set of data that (i) indicates an event location, (ii) indicates an event time, and (iii) identifies a plurality of users who are to receive a transport service to the event location;
based on receiving the set of data from the organizing user device, cause a recipient device of a recipient user of the plurality of users to present an accelerator user interface feature that is actionable by the recipient user to request the transport service to the event location without the recipient user inputting any information relating to the event location;
in response to receiving a service request from the recipient device requesting the transport service using the accelerator user interface feature, identify a service provider from a plurality of available service providers to provide the transport service for the recipient user from a start location of the recipient user to the event location; and
selectively apply a reduction to a price of the transport service based on determining, after the transport service for the recipient user is completed, whether a service location of the transport service for the recipient user is within a distance of the event location indicated by the set of data received from the organizing user device and whether a service time of the transport service for the recipient user is within a time duration of the event time indicated by the set of data received from the organizing user device.

2. The network system of claim 1, wherein the network system is further configured to cause the recipient device to display information relating to the event location and the event time within a user interface to request the transport service.

3. The network system of claim 1, wherein the network system is further configured to cause the recipient device to display, within a user interface to request the transport service, information relating to the at least one of the plurality of users other than the recipient user.

4. The network system of claim 1, wherein the executed instructions further cause the network system to identify the service provider at a time determined based on the event time specified by the organizing user.

5. The network system of claim 1, wherein the executed instructions further cause the network system to:
determine a first set of service progress information relating to the recipient user;
determine a second set of service progress information relating to a second user of the plurality of users; and
transmit the first set of service progress information and the second set of service progress information to the recipient device of the recipient user to cause the recipient device to display service progress information relating to both the recipient user and the second user.

6. The network system of claim 1, wherein the executed instructions further cause the network system to receive an input, from the organizing user, for a first value relating to the transport service for the recipient user, the first value corresponding to a reduction in a price of the transport service for the recipient user.

7. The network system of claim 1, wherein a photo of the organizing user is displayed within the accelerator user interface feature.

8. A computer-implemented method for generating event invitations, the method being performed by a network system and comprising:
receiving, from an organizing user device of an organizing user, a set of data that (i) indicates an event location, (ii) indicates an event time, and (iii) identifies a plurality of users who are to receive a transport service to the event location;
based on receiving the set of data from the organizing user device, causing a recipient device of a recipient user of the plurality of users to present an accelerator user interface feature that is actionable by the recipient user to request the transport service to the event location without the recipient user inputting any information relating to the event location;
in response to receiving a service request from the recipient device requesting the transport service using the accelerator user interface feature, identifying a service provider from a plurality of available service providers to provide the transport service for the recipient user from a start location of the recipient user to the event location; and
selectively applying a reduction to a price of the transport service based on determining, after the transport service for the recipient user is completed, whether a service location of the transport service for the recipient user is within a distance of the event location indicated by the set of data received from the organizing user device and whether a service time of the transport service for the recipient user is within a time duration of the event time indicated by the set of data received from the organizing user device.

9. The computer-implemented method of claim 8, wherein the network system is further configured to cause the recipient device to display information relating to the event location and the event time within a user interface to request the transport service.

10. The computer-implemented method of claim 9, wherein the network system is further configured to cause the recipient device to display, within the user interface to request the transport service, information relating to the at least one of the plurality of users other than the recipient user.

11. The computer-implemented method of claim 8, further comprising identifying the service provider at a time determined based on the event time specified by the organizing user.

12. The computer-implemented method of claim 8, further comprising:
determining a first set of service progress information relating to the recipient user;
determining a second set of service progress information relating to a second user of the plurality of users; and
transmitting the first set of service progress information and the second set of service progress information to the recipient device of the recipient user to cause the recipient device to display service progress information relating to both the recipient user and the second user.

13. The computer-implemented method of claim 8, further comprising receiving an input, from the organizing user, for a first value relating to the transport service for the recipient user, the first value corresponding to a reduction in a price of the transport service for the recipient user.

14. The computer-implemented method of claim 8, wherein a photo of the organizing user is displayed within the accelerator user interface feature.

15. A non-transitory computer-readable medium storing instructions that, when executed by one or more processors of a network system, cause the network system to:
   receive, from an organizing user device of an organizing user, a set of data that (i) indicates an event location, (ii) indicates an event time, and (iii) identifies a plurality of users who are to receive a transport service to the event location;
   based on receiving the set of data from the organizing user device, cause a recipient device of a recipient user of the plurality of users to present an accelerator user interface feature that is actionable by the recipient user to request the transport service to the event location without the recipient user inputting any information relating to the event location;
   in response to receiving a service request from the recipient device requesting the transport service using the accelerator user interface feature, identify a service provider from a plurality of available service providers to provide the transport service for the recipient user from a start location of the recipient user to the event location; and
   selectively apply a reduction to a price of the transport service based on determining, after the transport service for the recipient user is completed, whether a service location of the transport service for the recipient user is within a distance of the event location indicated by the set of data received from the organizing user device and whether a service time of the transport service for the recipient user is within a time duration of the event time indicated by the set of data received from the organizing user device.

16. The non-transitory computer-readable medium of claim 15, wherein the executed instructions further cause the network system to:
   determine a first set of service progress information relating to the recipient user;
   determine a second set of service progress information relating to a second user of the plurality of users; and
   transmit the first set of service progress information and the second set of service progress information to the recipient device of the recipient user to cause the recipient device to display service progress information relating to both the recipient user and the second user.

17. The non-transitory computer-readable medium of claim 15, wherein the executed instructions further cause the network system to receive an input, from the organizing user, for a first value relating to the transport service for the recipient user, the first value corresponding to a reduction in a price of the transport service for the recipient user.

18. The non-transitory computer-readable medium of claim 17, wherein the network system is further configured to cause the recipient device to display information relating to the event location and the event time within a user interface to request the transport service.

19. The non-transitory computer-readable medium of claim 17, wherein the network system is further configured to cause the recipient device to display, within a user interface to request the transport service, information relating to the at least one of the plurality of users other than the recipient user.

20. The non-transitory computer-readable medium of claim 17, wherein the executed instructions further cause the network system to identify the service provider at a time determined based on the event time specified by the organizing user.

* * * * *